US010156383B2

United States Patent
Magaldi (10) Patent No.: US 10,156,383 B2
(45) Date of Patent: Dec. 18, 2018

(54) SYSTEM OF SECONDARY REFLECTORS WITH HIGH LEVEL OF EFFICIENCY FOR STORAGE AND USE OF ENERGY FROM A SOLAR SOURCE

(71) Applicant: MAGALDI INDUSTRIE S.R.L., Salerno (IT)

(72) Inventor: Mario Magaldi, Salerno (IT)

(73) Assignee: MAGALDI INDUSTRIES S.R.L., Salerno (IT)

( * ) Notice: Subject to any disclaimer, the term of this patent is extended or adjusted under 35 U.S.C. 154(b) by 337 days.

(21) Appl. No.: 14/786,936

(22) PCT Filed: May 2, 2014

(86) PCT No.: PCT/IB2014/061149
§ 371 (c)(1),
(2) Date: Oct. 23, 2015

(87) PCT Pub. No.: WO2014/178024
PCT Pub. Date: Nov. 6, 2014

(65) Prior Publication Data
US 2016/0076792 A1 Mar. 17, 2016

(30) Foreign Application Priority Data
May 3, 2013 (IT) .............................. RM2013A0263

(51) Int. Cl.
G02B 17/00 (2006.01)
F24S 23/79 (2018.01)
(Continued)

(52) U.S. Cl.
CPC ............... *F24S 23/79* (2018.05); *F24S 23/77* (2018.05); *F24S 50/20* (2018.05); *G02B 17/002* (2013.01);
(Continued)

(58) Field of Classification Search
CPC ......... F24J 2/38; F24J 2/18; F24J 2/16; G02B 17/002; G02B 19/0042; G02B 26/0816; Y02E 10/40
See application file for complete search history.

(56) References Cited

U.S. PATENT DOCUMENTS

| 4,505,953 A * | 3/1985 | Chen ...................... C09K 5/063 427/212 |
| 2010/0319678 A1 | 12/2010 | Maemura |
| 2011/0088246 A1 | 4/2011 | Tuli |

FOREIGN PATENT DOCUMENTS

WO    WO 2012/153264 A2    11/2012

OTHER PUBLICATIONS

International Search Report issued for International Application No. PCT/IB2014/061149 filed on May 2, 2014 in the name of Magaldi Industrie S.R.L. dated Jul. 25, 2014.
(Continued)

Primary Examiner — Alfred Basichas
(74) Attorney, Agent, or Firm — Steinfl + Bruno LLP (57) ABSTRACT

A secondary optical system to increase efficiency in collecting solar radiation concentrated by primary mirrors in "beam-down" plant configurations is described. Such secondary optical system is formed at least by two reflectors—preferably in form of plane mirrors arranged at different heights—oriented to associate to each of them a sub-section of a primary field of heliostats. The secondary reflectors—each one associated to a different primary focus $F1,i$ ($i=1, \ldots, n$) corresponding to a sub-set of primary concentrators—allow concentration of solar rays towards a single secondary focus F2.

17 Claims, 7 Drawing Sheets

(51) Int. Cl.
| | |
|---|---|
| *F24S 50/20* | (2018.01) |
| *G02B 19/00* | (2006.01) |
| *G02B 26/08* | (2006.01) |
| *F24S 23/77* | (2018.01) |

(52) U.S. Cl.
CPC ..... *G02B 19/0042* (2013.01); *G02B 26/0816* (2013.01); *Y02E 10/40* (2013.01)

(56) References Cited

OTHER PUBLICATIONS

Written Opinion of the International Searching Authority issued for International Application No. PCT/IB2014/061149 filed on May 2, 2014 in the name of Magaldi Industrie S.R.L. dated Jul. 25, 2014.
International Preliminary Report on Patentability issued for International Application No. PCT/IB2014/061149 filed on May 2, 2014 in the name of Magaldi Industrie S.R.L. dated Jul. 13, 2015.

\* cited by examiner

SYSTEM OF SECONDARY REFLECTORS WITH HIGH LEVEL OF EFFICIENCY FOR STORAGE AND USE OF ENERGY FROM A SOLAR SOURCE

CROSS REFERENCE TO RELATED APPLICATIONS

The present application is the US national stage of International Patent Application PCT/IB2014/061149 filed internationally on May 2, 2014, which claims priority to Italian Patent Application No. RM2013A00263 filed on May 3, 2013.

TECHNICAL FIELD OF THE INVENTION

The present invention relates to a secondary optical system suitable to collect the solar radiation collected (reflexed) by a primary optical system arranged at the ground and to direct (reflect) such solar radiation towards a receiver, placed at the ground too. Such secondary optical reflection system is then conceived to be used in a so-called "beam down" configuration, wherein the solar radiation is concentrated from the top on a receiver placed lower, typically at the ground.

The invention system is particularly suitable to be used in plants for producing thermal and/or electric energy starting from the solar radiation itself (that is in the so-called "thermal solar" or in the "photovoltaic solar" plant).

BACKGROUND

In the plants for generating energy of solar origin, the known art is using heliostats—and in particular a field of reflecting mirrors—for concentrating the solar radiation on a determined target, typically a receiver placed at a height using the thermal energy of the solar source that is it houses concentration photovoltaic cells. The heliostats produce the lighting of a big or small area—so-called "impression"—near the target. In an ideal/theoretical system, such area reduces to a point and it corresponds to the focus of the system of heliostats.

The just mentioned known systems with receiver at a height have difficulties and complexity associated indeed to the installation and maintenance at height of a heavy object. Such drawbacks worsen upon increasing the power of the plant for generating energy, as, as it is known, upon increasing such power, even the surface occupied by the field of the heliostats and consequently the height of the related focus and then the positioning height of the receiver increase proportionally.

Such drawbacks are overcome in a configuration alternative to the just mentioned one, already known too and typically called "beam-down". In the latter configuration a secondary optical system associated to the primary heliostat field is used. The secondary optical system is installed at height and it reflects the radiation concentrated by the primary heliostats towards a receiver positioned at the ground.

In such configuration, the primary focus is the point wherein the rays concentrated by the heliostats in absence of the secondary reflector would converge, whereas the secondary focus is the point wherein the rays converge after reflecting on the secondary reflector and it corresponds, in an ideal/theoretical system, to the site wherein the receiver is placed. In a real system, even the secondary focus corresponds to an area and not to a point, that is it is associated to a "impression".

Generally, the plants of the "beam-down" type provide as secondary optical system a single reflector in the form of half-ellipsoid or hyperboloid sheet, sometimes implemented by means of a plurality of plane mirrors with small sizes arranged adjacent and so as to be near the wished curvature degree.

As already mentioned above, the light impressions produced by the heliostats or by the secondary reflector are never punctual. This depends both upon the solar divergence, as the rays coming from the sun are not parallel, and upon errors in the curvature of the mirrors implementing the primary and secondary reflectors. In particular, heliostats with big sizes, chosen based upon scale economies, associated to curved secondary reflectors can produce very big impression enlargements on the receiver with respect to the size of the impression obtainable on a receiver placed in the primary focus, that is at height on the top of a dedicated structure.

Figure 1:
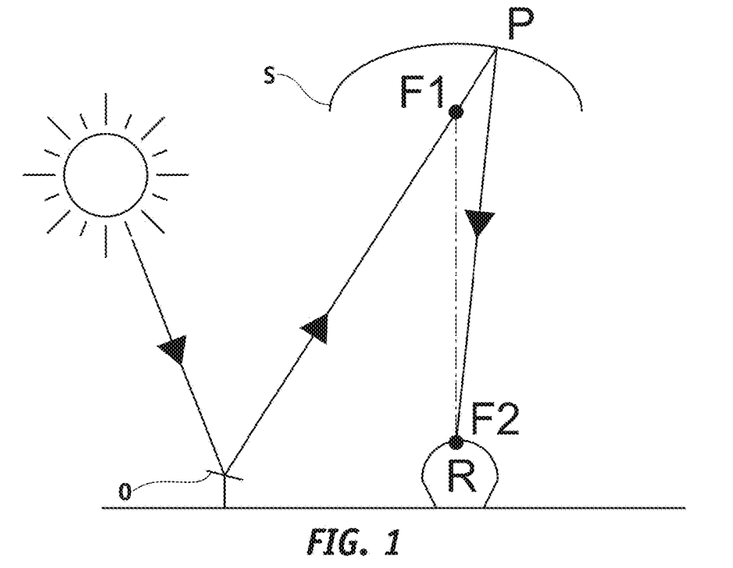
FIG. 1, already mentioned above, represents a scheme of a known configuration of beam down type with concave secondary reflector.
Figure 2:
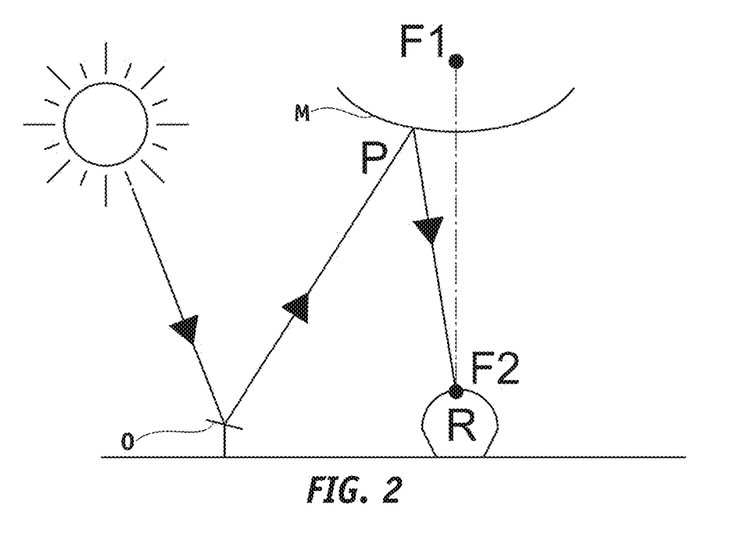
FIG. 2, already mentioned above, represents a scheme of a known configuration of beam down type with convex secondary reflector.

FIGS. 1 and 2 show schematically an example of "beam down" configuration with secondary reflector with curved reflecting surface, in particular respectively concave and convex surface. In such figures, the secondary reflector is designated with S and M, respectively, an exemplifying primary reflector with O, the primary focus with F1, the point or area of reflection on the secondary reflector with P, the secondary focus with F2 and the receiver with R.

When the secondary reflector is curved, it brings in an optical enlargement of the impression corresponding to the primary focus F1 of the heliostats O, which enlargement is linked to the distance of the reflection point P from the two focuses F1 and F2. In particular, the size of the impression of the rays concentrated by a single primary reflector is enlarged by a quantity proportional to the ratio between the distances P–F2 and P–F1.

Figure 3:
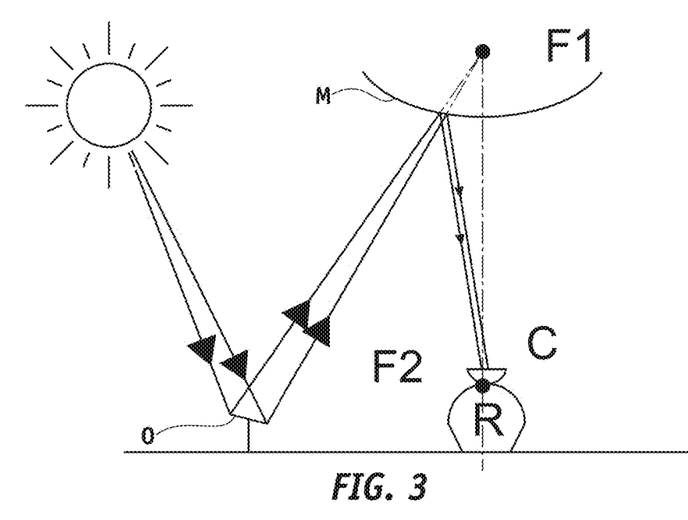
FIG. 3, already mentioned above, shows a scheme of the system of FIG. 2 with a concentrator associated to the receiver.

FIG. 3 exemplifies the impression corresponding to the secondary focus F2 in case of the convex reflector of FIG. 2.

The enlargement of the concentrated light impression obliges to increase the surface of the receiver R, thus increasing the thermal losses, that is to insert an additional concentrator C near the secondary focus F2. In particular, in the case wherein the receiver is a means for storing thermal energy heated by the solar radiation penetrating the cavity, the increase in the impression of the secondary focus F2 would require an increase in the sizes of the inlet mouth of the cavity itself. On the other side, the interposition of an additional concentrator C between the radiation reflected by the secondary mirror M and the receiver R induces additional optical losses due to the not ideal reflectivity of such additional concentrator.

As said, the curved secondary reflectors are usually approximated with small plane mirrors and this brings in even greater uncertainty about the system precision, potential cause of (additional) enlargement of the impression on the receiver.

Figure 4:
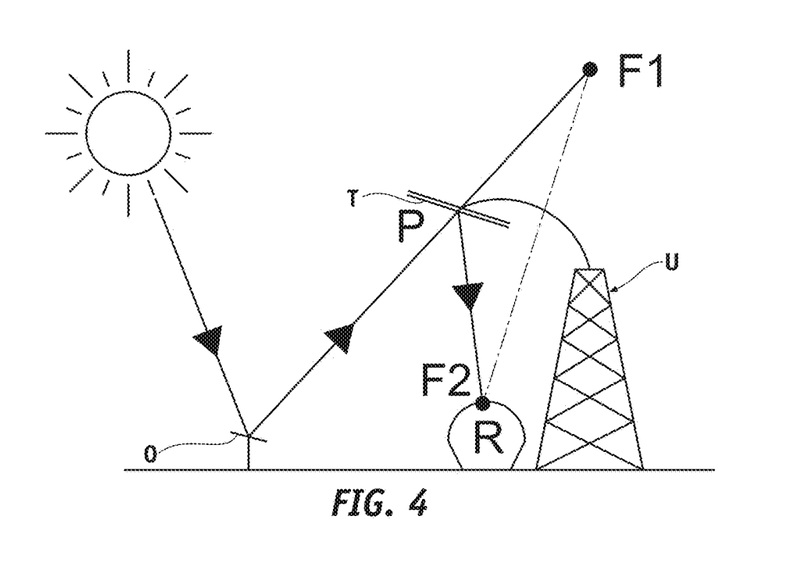
FIG. 4, already mentioned above, represents a scheme of a configuration of beam down type with plane secondary reflector tilted with respect to the ground.
Figure 5:
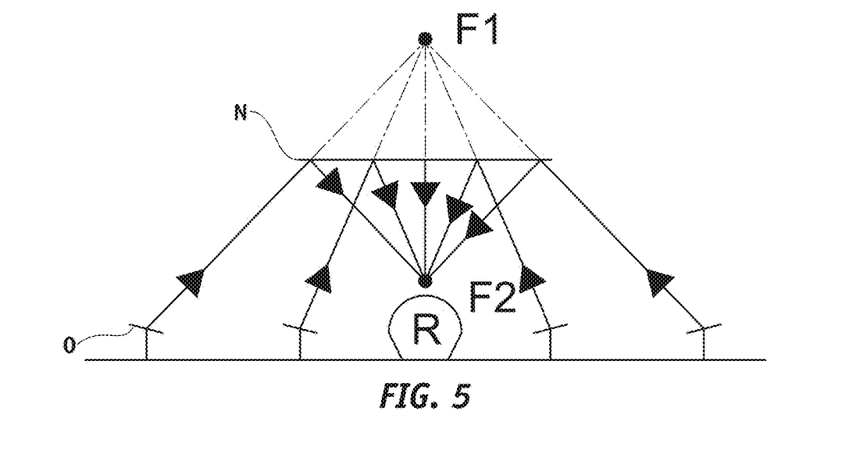
FIG. 5, already mentioned above, represents a scheme of a configuration of beam down type with plane secondary reflector horizontal with respect to the ground.
Figure 6:
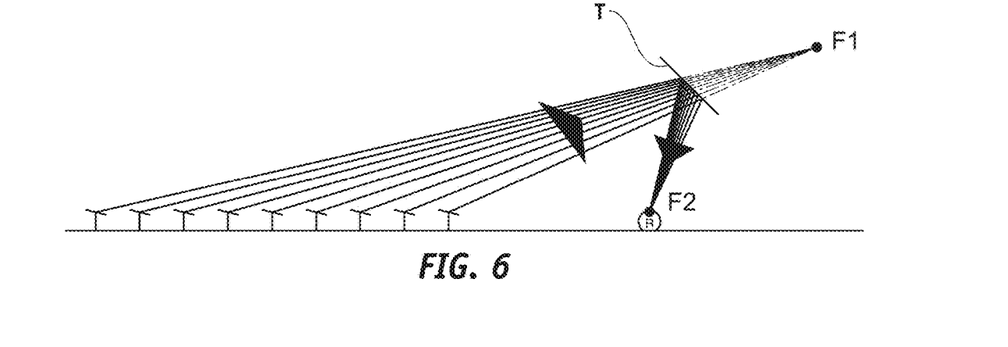
FIG. 6, already mentioned above, represents a scheme of a configuration of beam down type with plane secondary reflector tilted with respect to the ground, in case of a high number of primary reflectors.

A possible solution to the problems deriving from the choice of curved surfaces for the secondary reflector is represented by the use of plane surfaces, as shown in FIGS. 4 to 6. However, even this last choice causes some problems.

By referring to FIG. 4, as known a plane mirror T must be placed at the same distance from the two focuses F1 and F2 in order to avoid an optical enlargement of the concentrated impression. In particular, in order to obtain that all direct rays in F1 converge towards F2 the plane mirror must be positioned at the same distance from F1 and F2 and tilted so as to result orthogonal to the joining line F1-F2. As shown in FIG. 4, the plane mirror T needs a dedicated supporting structure U, even so as to prevent that it shades the receiver at the ground R.

It is also known that the height of the primary focus F1 is proportional to the efficiency in concentrating the radiation and exploiting the soil. However, upon increasing the height of the primary focus F1, the reflection surfaces needed on the plane mirror and thus the loading capability of the related supporting structure increase. Furthermore, a secondary reflector with big sizes would cast a wide shadow on the primary reflectors. In fact, as exemplified in FIG. 5, with a field of heliostats O with circular plan a secondary reflector N parallel to the ground—and by considering vertical the axis F1-F2—would be a very big disc, with ray equal to half of the heliostat field one. As exemplified in FIG. 6, in case of tilted axis F1-F2 the plane reflector, also here designated with T, in any case would have the farest area from the joining line F1-F2 involved by the solar flows considerably higher than the average on the reflector itself, with risks for the mechanical integrity (for example due to differentiated thermal expansions along the extension of the reflecting surface).

SUMMARY OF THE INVENTION

The technical problem placed and solved by the present invention is then to provide a secondary optical reflection system and a related method allowing to obviate the drawbacks mentioned above with reference to the known art.

Such problem is solved by a system according to claim 1, by an assembly according to claim 7 and by a method according to claim 17.

Preferred features of the present invention are subject of the depending claims.

The present invention provides a secondary optical system, in particular a set of mirrors, able to increase the efficiency in collecting the solar radiation concentrated by primary mirrors in so-called "beam-down" plant configurations. The invention system allows high productive efficiencies of the plant wherein it is inserted, low investment and maintenance costs and high operating safety.

The secondary optical system of the invention is formed by at least two secondary reflectors—preferably in the form of plane mirrors—typically oriented so as to associate to each one thereof a sub-section of a field of heliostats, that is of primary concentrators. In particular, the invention allows concentrating the solar rays towards a single secondary focus F2 by means of a plurality of secondary reflectors, preferably plane and typically arranged at different heights and/or different distances from the vertical axis passing by F2, each one thereof is associated to a different primary focus F1,$i$ with i=(1, . . . , n). In particular, each primary focus F1,$i$ corresponds to a sub-set of primary concentrators, for example, as said, to the concentrators of a portion of the field of heliostats.

The primary focuses F1,$i$ advantageously are placed at high height, thus by increasing the efficiency in collecting the concentrated radiation with a better exploitation of the overall dimension at the ground.

With a plurality of focuses F1,$i$ it is possible obtaining a collection of the solar radiation by limiting enormously the problems of optical enlargement of the impression mentioned with reference to the known art. It is further possible reducing, other conditions being equal, the size of the plane reflecting surface of the single secondary reflector and consequently decreasing the average solar flows with respect to the case of one single secondary plane mirror associated to one single primary focus.

The possibility of using plane secondary reflectors exemplifies very much the steps for constructing and installing the system of the invention.

The invention also provides plants or processes for producing thermal or concentration photovoltaic energy using the above-mentioned secondary optical system.

In particular, the invention system advantageously is associated to a receiver placed at the ground constituted by a device for storing/exchanging thermal energy of solar origin, preferably based upon a bed of fluidizable storage particles.

In more general terms, in the present context under "receiver" or "device for receiving" the solar radiation concentrated by the secondary optical system any means is meant indeed suitable to receive such radiation, in particular a reactor device or a device for storing, exchanging and/or transforming thermal or light energy.

Other advantages, features and use modes of the present invention will result evident from the following detailed description of some embodiments, shown by way of example and not for limitative purpose.

BRIEF DESCRIPTION OF THE FIGURES

The figures of the enclosed drawings will be referred to, wherein.

DETAILED DESCRIPTION OF SOME PREFERRED EMBODIMENTS

Figure 7:
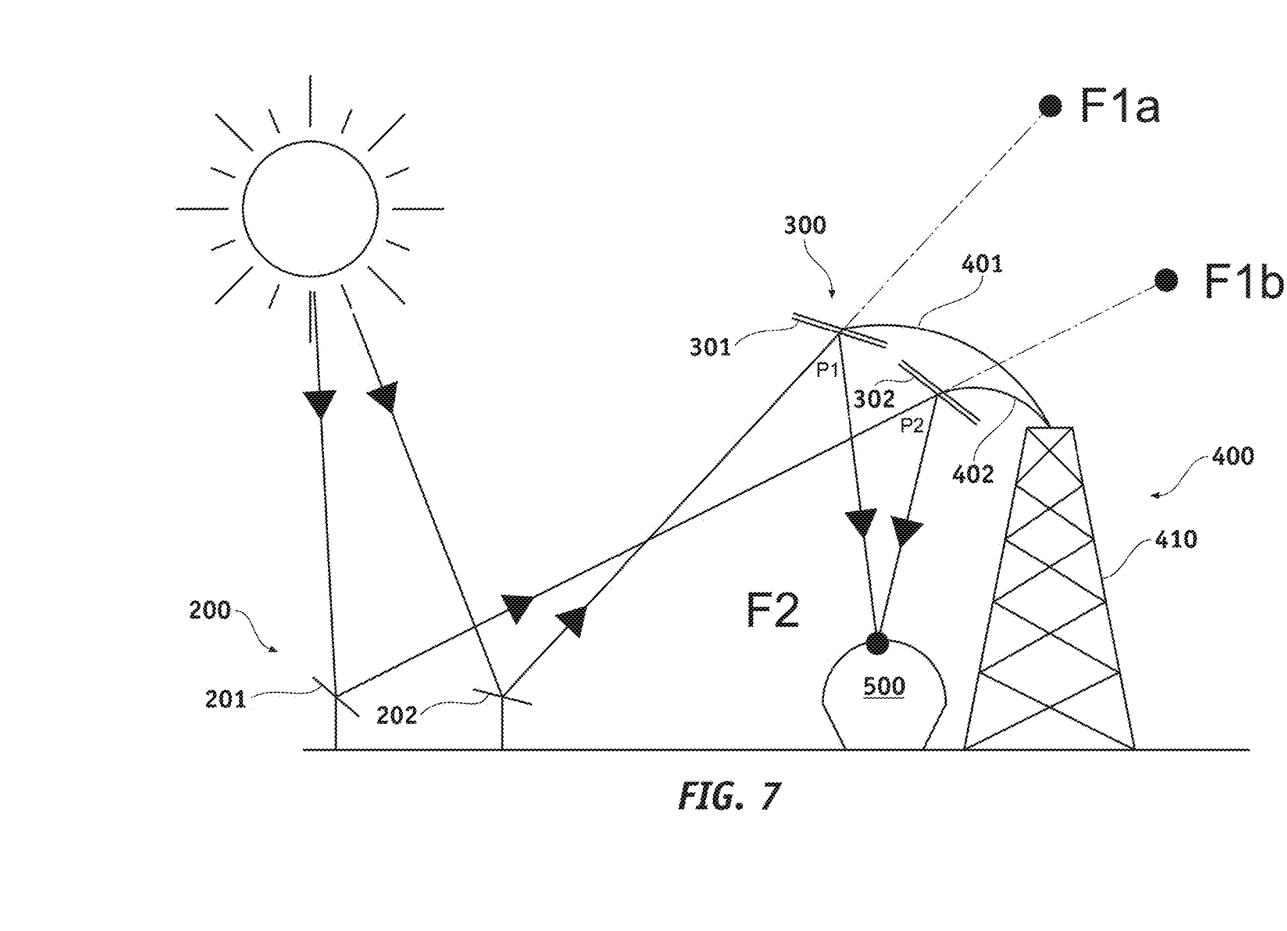
FIG. 7 shows a schematic representation, in side view, of a secondary optical system according to a base embodiment of the invention.

FIG. 7 shows in schematic way a base embodiment of a secondary optical reflection system according to the present invention. In such figure the secondary system is designated as a whole with 300.

The optical system 300 is suitable to be used in a plant for storage and/or production of energy of solar origin having an overall configuration of "beam down" type. In particular, the secondary system 300 is associated to a primary optical reflection system designated as a whole with 200 and arranged at the ground.

The primary system 200 is configured so as to reflect the incident solar radiation according to two primary focuses F1a and F1b. To this purpose, the primary system 200, in the represented example, comprises two primary optical reflection elements, respectively 201 and 202, each one indeed suitable to reflect the solar radiation in a respective focus F1a and F1b.

The secondary system 300 is configured so as to reflect the radiation concentrated at the primary focuses F1a and F1b towards one single secondary focus F2. To this purpose, the secondary system 300, in the represented example, comprises two secondary reflection optical elements, respectively 301 and 302, each one associated to a respective primary focus F1a and F1b, that is suitable to reflect the solar radiation concentrated in the respective primary focus F1a and F1b towards the common secondary focus F2.

Still in the present example, the secondary reflection elements 301 and 302 have a plane reflection surface. In particular, they are plane mirrors.

Embodiment variants can provide the use, in particular for the secondary elements 301 and 302, of a curved reflecting surface, in particular a concave or convex surface.

For the reasons already illustrated in the introduction, preferably each secondary reflection element 301, 302 is arranged so that the respective plane reflection surface is substantially orthogonal to the line joining the respective primary focus F1a, F1b with the secondary focus F2. Furthermore, still based upon what already illustrated in the introduction preferably each secondary reflection element 301, 302 is arranged so that the respective reflection point P1, P2—or the average point of the reflection impression—is equidistant from the secondary focus F2 and from the respective primary focus F1a, F1b.

The secondary system 300 further comprises support means 400 for the secondary elements 301 and 302. In the present example, advantageously such support means 400 is common for the two secondary elements 301 and 302. In particular, it comprises a pillar or tower 410 therefrom two transversal supports 401 and 402 depart each one associated to a respective secondary element 301 or 302. In the represented example, the transversal supports 401 and 402 have a substantially curved profile.

Preferably, the support means 400 are suitable to support the secondary elements 301 and 302 at different heights the one with respect to the other one.

The height from the ground requested for the secondary elements 301 and 302 depends upon the distance between the respective primary focus and the secondary focus.

Advantageously, the secondary reflector elements 301 and 302 and/or the primary reflector elements 201 and 202 are selectively orientable, preferably individually. In particular, a possibility of biaxial orientation by means of kinematic motion is provided, so that said reflector elements can follow the apparent motion of the sun to reflect the radiation towards the respective focus.

Preferably, the orientation of the primary and secondary reflector elements is coordinated, advantageously in automatic way, in order to obtain the wished arrangement already mentioned above.

In the represented example, the secondary focus F2 falls at a receiver device 500, preferably a device for storing thermal energy and still more preferably a device of fluidizable particle bed type.

Figure 8:
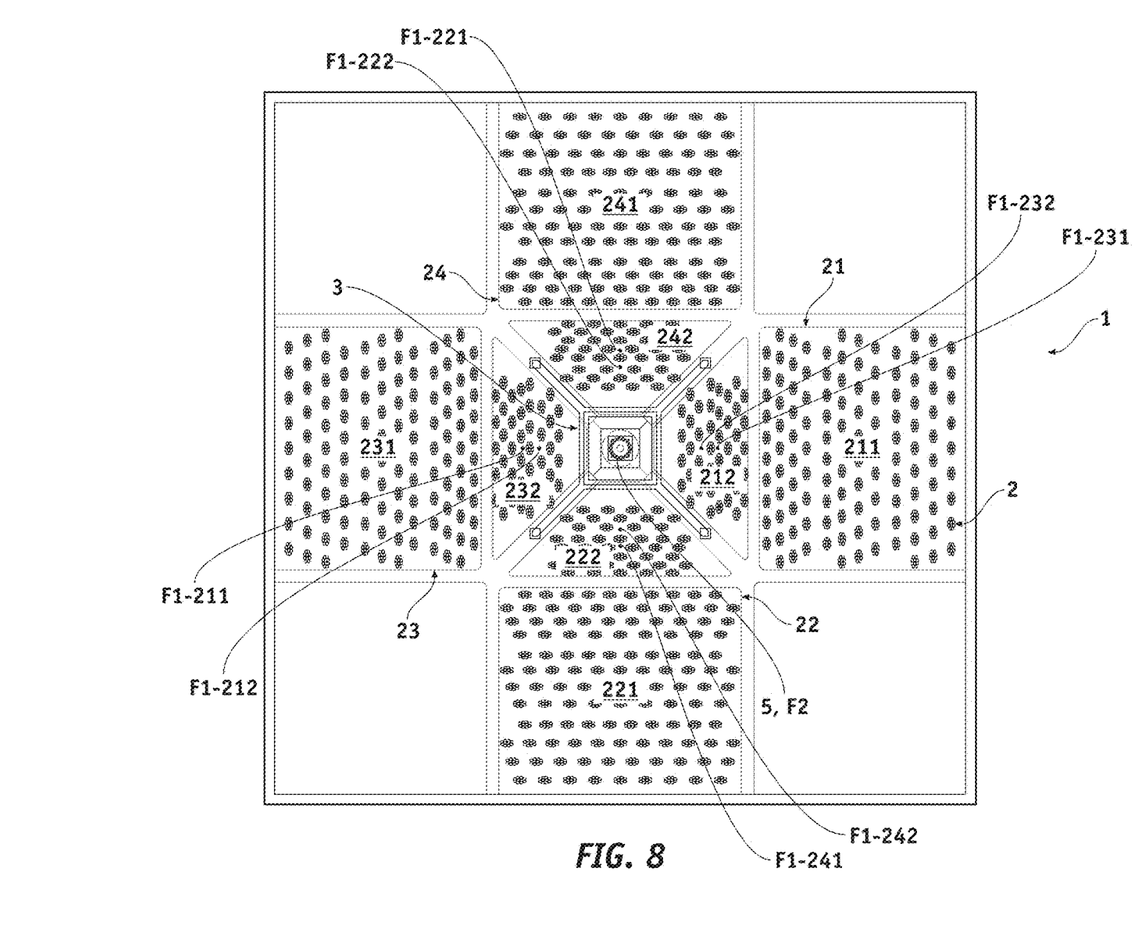
FIG. 8 shows a plan view of (a portion of) a plant for storing thermal energy of solar origin incorporating a secondary optical system according to a preferred embodiment of the invention.
Figure 9A:
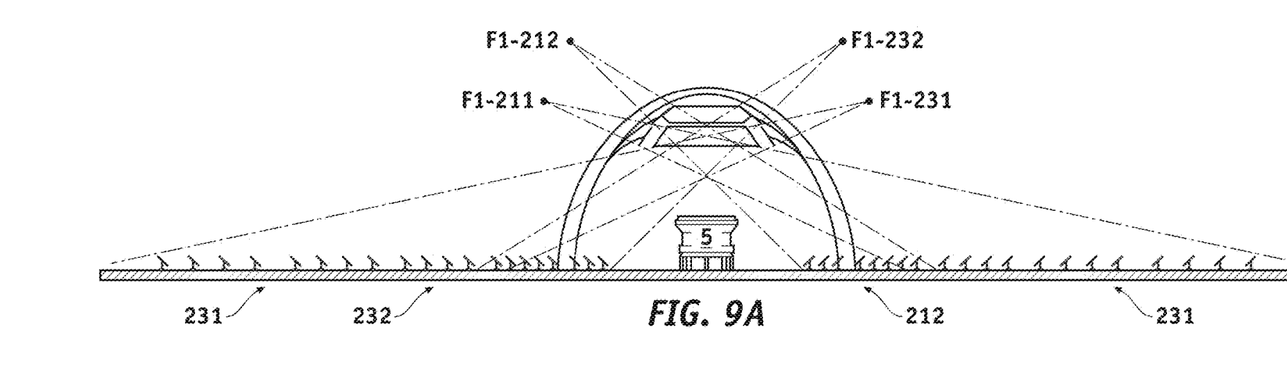
FIG. 9A shows a schematic side view of the plant of FIG. 8.
Figure 9B:
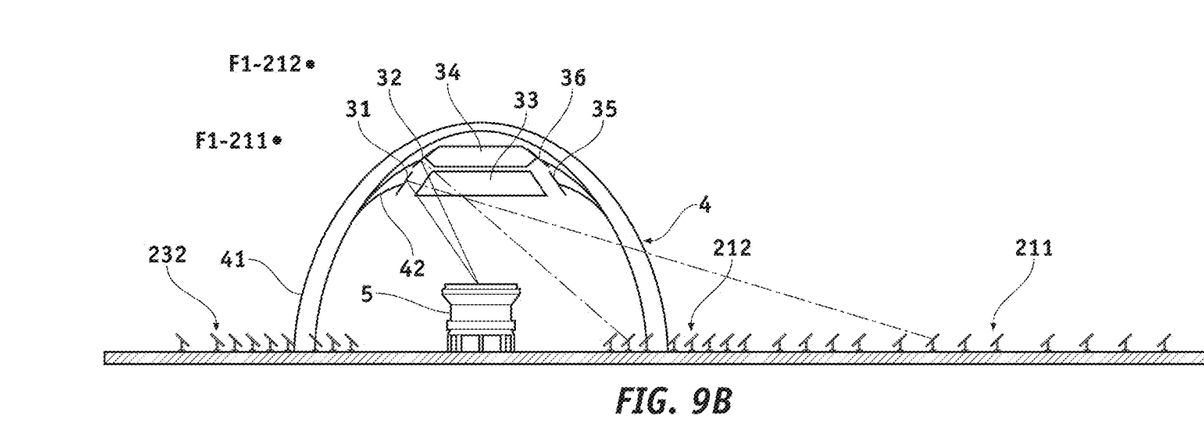
FIG. 9B shows the same view of FIG. 9A, wherein some components have not been represented for greater illustration clarity.
Figure 10:
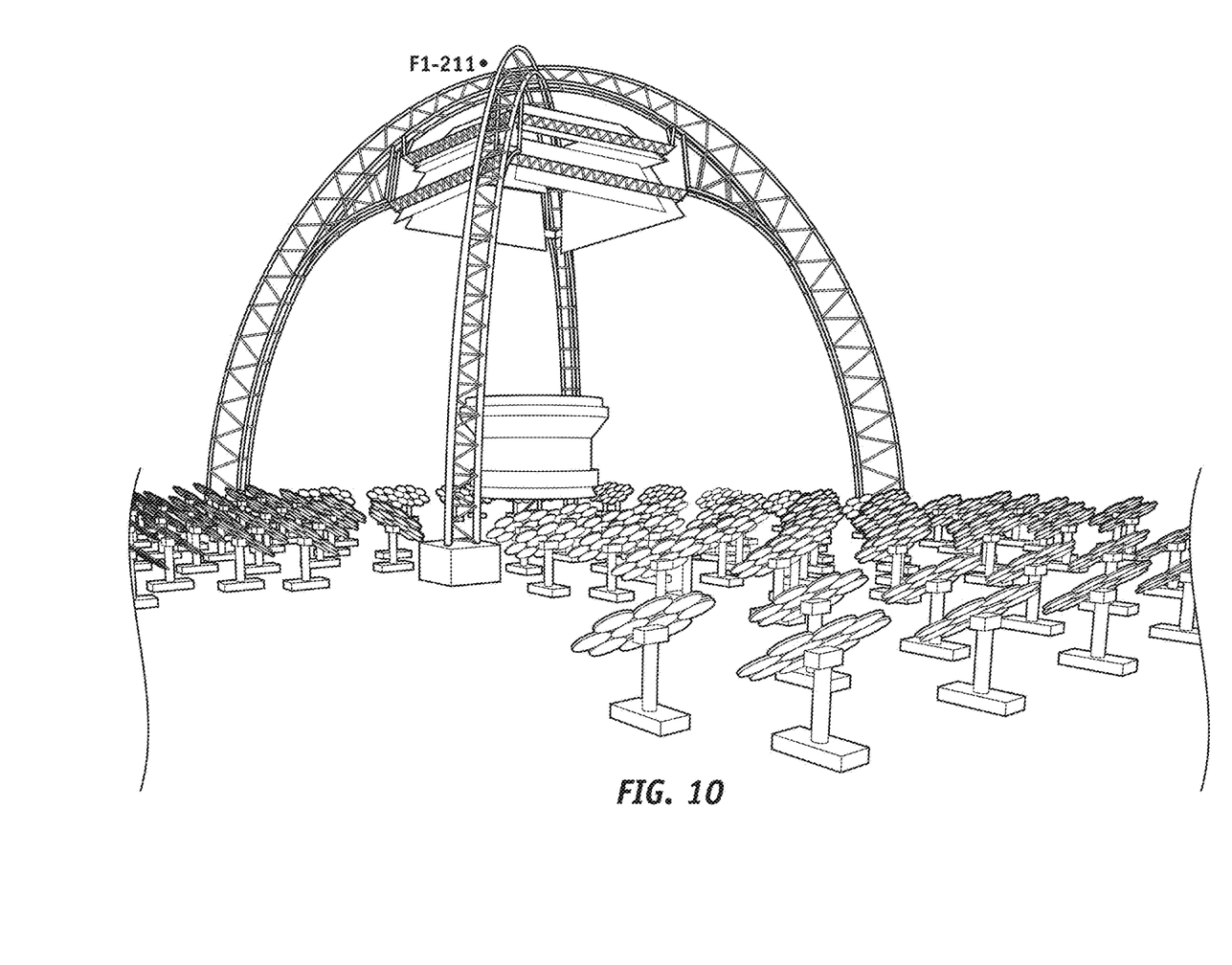
FIG. 10 shows a perspective rendering of the plant of FIG. 8.

By referring to FIGS. 8 to 10 a preferred embodiment of the secondary optical reflection system of the invention will be now described, inserted in a plant too according to a preferred embodiment of the invention. All features illustrated above in relation to the base embodiment of FIG. 7 and to the related variants can be applied even to the plant considered herein and therefore they will not be repeated hereinafter.

By referring to the above-mentioned FIGS. 8 to 10, the plant, designated as a whole with 1, is a thermodynamic plant for storing and producing energy. The plant 1 comprises the above-mentioned secondary optical reflection system, herein designated as a whole with 3, an associated primary reflection optical system, herein designated as a whole with 2 and a receiver device, herein designated as a whole with 5.

The configuration of the plant, and in particular of the optical systems 2 and 3 and of the receiver device 5, is of "beam down" type, as already illustrated by referring to the embodiment of FIG. 7.

The primary optical system 2, in the present example, comprises a heliostat field stationed according to the four cardinal points around the receiver device 5 and the secondary optical system 2, the latter then arranged in central position with respect to the heliostat field 2 itself. In particular, four main portions of the heliostat field 2 are provided, respectively designated with the references 21 to 24 and each one corresponding, as said, to a particular room stationing which in the present example is associated to a cardinal point. The plan arrangement, shown in FIG. 8, is so that each portion 21, ..., 24 of the heliostat field 2, in turn, is formed by two adjacent portions, each one thereof with substantially polygonal shape. In particular, in the present example a first portion with substantially squared or rectangular shape is provided, designated by way of example with 211 for the first portion 21 and with analogous references 221, 231 and 241 for the other portions 22, ..., 24, and by a second portion substantially shaped like a triangle, designated by way of example with 212 still for the first portion 21 and with analogous references 222, 232 and 242 for the other portions 22, ..., 24.

Each portion of the heliostat field 211, ..., 241 and 212, ..., 242 concentrates the incident solar radiation in a respective primary focus F1-211, ..., F1-242. Therefore, in the present example eight portions of the primary heliostat field 2 and eight corresponding primary focuses F1-$i$ ($i$=211, 221, 231, 241, 212, 222, 232, 242) are provided as a whole.

The secondary optical system 3 comprises then a corresponding plurality of secondary reflection elements, designated with the references 31 to 38 and each one associated to a respective primary focus F1-$i$ in the already illustrated way, that is so as to reflect the solar radiation concentrated at said primary focus in a common secondary focus F2 falling at the receiver device 5, in particular a portion selected from the latter. In the already mentioned case of received constituted by a storage device of recess-like type, the focus F2 advantageously will be placed at a point of the central axis of the recess.

In the FIGS. 9A and 9B only a portion of the heliostat field and of the respective secondary focuses (in FIG. 9B, for better illustration clarity, some components have not been represented) is visible.

In brief, the rays concentrated by the heliostats of the portion of field 211 as primary focus have the one designated with F1-211 and the related secondary reflector is the reflector 31. The radiation concentrated by the heliostats of the portion of field 211 is intercepted according to the focus F1-211 by the secondary reflector 31 and cast in the focus F2 corresponding to the placing of the receiver device 5. Analogously, the rays concentrated by the heliostats of the portion of field 212 have as primary focus the one designated with F1-212 and the related secondary reflector is the reflector 32. The radiation concentrated by the heliostats of the portion of field 212 is intercepted according to the focus F1-212 by the secondary reflector 32 and cast in the common secondary focus F2.

Analogous associations are valid for the remaining portions of the heliostat field 2, for the related primary focuses and for the corresponding secondary reflector elements.

Correspondingly to the placing of the portions of the primary heliostat field 21-24, even the secondary reflector elements 31-38 are arranged according to the four cardinal points, and in particular in pairs of secondary elements 31-32, 33-34, 35-36 and 37-38, each one corresponding to a portion 21, . . . , 24 of the heliostat field. In particular, the first secondary reflector 31, 33, 35 and 37 of each pair generally is arranged below the other reflector 32, 34, 36 and 38 of the same pair (or, in alternative variants, viceversa).

The secondary optical system 3, even in this case, comprises means for supporting the secondary reflector elements, herein designated as a whole with 4 and better visible in FIGS. 9B and 10. In the present example, the support means 4 comprises an arcuate supporting structure 41 and a plurality of transversal supporting elements—one thereof designated by way of example with 42 in FIG. 9B—analogous to those already described with reference to the embodiment of FIG. 7. In FIG. 10 an example implementing the supporting structure 42 can be appreciated in greater details, which in this case has a substantially cross-like shape.

Such shape of the supporting structure is preferred allowing to eliminate the effect of locking (physical obstacle) the optical path between the primary and secondary reflectors. In fact, the proposed structure is so as to define a plurality of rooms in selected positions corresponding indeed to the reflection path from the primary to the secondary elements. For example, in FIG. 10 such rooms are defined both by the spaces interposed between the different arches forming the cross.

The rooms are further so as to reduce, in the broadest extent as possible and by considering the solar cycles, shadow areas at the primary reflectors.

Even in this case preferably the heliostats of the primary field 2 and/or the secondary reflector elements of the system 3 are selectively orientable, preferably by means of a biaxial kinematic motion, according to what already illustrated. Preferably, the heliostats of each portion 211-242 are orientable even in group.

The configuration illustrated above with reference to FIGS. 8 to 10 represents a preferred solution among the possible configurations wherein one has to associate n areas of a field of heliostats to as many n primary focuses and related n secondary reflectors, all having the same secondary focus coincident with the receiver of the concentrated radiation.

As already said above with reference to the embodiment of FIG. 7, a preferred embodiment provides that the secondary reflector elements are plane and arrange at the same distance from the respective primary focus and from the secondary focus, so as to avoid an optical enlargement of the impression concentrated by the heliostats.

Advantageously, as already mentioned the primary focuses can be arranged high, such effect, as it is known, allows optimizing the use of the ground, by decreasing the distance between the heliostats and reducing the known "cosine" effect which penalizes the reception efficiency of the heliostats.

It will be understood that the invention provides even a method for concentrating a solar radiation on a receiver for the production and/or the storage of energy of solar origin in an overall "beam down" configuration. In most general definition thereof, such method provides the use of a primary optical system arranged at the ground and configured so as to reflect the incident solar radiation according to a plurality of primary focuses, and the use of a secondary optical reflection system which collects the solar radiation coming from the primary system and directs it toward a single secondary focus. Preferably, the method provides an implementation according to the functional modes and/or the structural features already described above with reference to FIGS. 7 to 10.

In the present context, under arrangement "at the ground" of the primary reflector elements and/or of the receiver device even an arrangement can be meant wherein they are at a lower height than that of the reflector elements of the secondary system.

The present invention has been sofar described with reference to preferred embodiments. It is to be meant that other embodiments belonging to the same inventive core may exist, as defined by the protection scope of the herebelow reported claims.

The invention claimed is:

1. An optical assembly, configured to be used in a plant for storage and/or production of energy of solar origin, which optical assembly comprises:
   a primary optical reflection system, arranged at the ground and configured so as to, reflect the incident solar radiation according to a plurality of primary focuses, which primary optical system comprises one or more primary reflector elements selectively steerable, individually and/or in groups; and
   a secondary optical reflection system, configured so as to collect the solar radiation coming from the primary system and direct it towards a single secondary focus, which secondary optical system comprises a plurality of secondary reflector elements, each one associated with a respective primary focus,
   wherein said secondary reflector elements, or a subset thereof, have a planar reflective surface, and
   wherein said secondary system is configured so that, in use, the secondary elements of said plurality reflect the radiation concentrated at the respective primary focuses towards said single common secondary focus.

2. The optical assembly according to claim 1, wherein said primary optical system comprises a plurality of primary reflector elements in the form of heliostats and/or mirrors.

3. The optical assembly according to claim 1, wherein said primary optical system is partitioned into a plurality of areas, each one corresponding to a respective primary focus and/or secondary reflector element.

4. The optical assembly according to claim 3, wherein each area of said plurality areas is stationed along a respective cardinal point.

5. The optical assembly according to claim 1, wherein said secondary optical system is arranged in a central position with respect to said primary optical system.

6. The optical assembly according to claim 1, wherein said secondary reflector elements are arranged at different heights and/or distances from the vertical axis passing for the common secondary focus.

7. The optical assembly according to claim 1, wherein said secondary reflector elements are selectively orientable individually and/or in groups.

8. The optical assembly according to claim 1, comprising a support of said secondary reflector elements.

9. The optical assembly according to claim 8, wherein said support means is such not to pose obstacles to the optical path between said primary reflection system and said secondary reflection system, having rooms arranged at selected positions.

10. A plant for storage and/or production of energy of solar origin comprising:
   the optical assembly according to claim 1; and
   a receiver, arranged substantially at or in proximity of said secondary focus.

11. The plant according to claim 10, wherein said receiver comprises a storage device of fluidizable particle bed type.

12. The plant according to claim 10, which is a plant for production of thermal and/or electric energy, in this latter case in particular a thermodynamic solar plant.

13. A method for concentrating a solar radiation on a receiver for the production and/or the storage of energy of solar origin,
   which method provides the use of a primary optical reflection system, arranged at the ground and configured so as to reflect the solar radiation according to a plurality of primary focuses,
   and of a secondary optical reflection system, which collects the solar radiation coming from the primary system and directs it toward a single secondary focus,
   which method uses an optical assembly according to claim 1.

14. The method according to claim 13, wherein said primary optical system and/or said secondary optical system comprise a plurality of reflector elements.

15. The method according to claim 14, wherein said reflector elements are selectively orientable individually and/or in groups.

16. The method according to claim 14, wherein said secondary optical system comprises a plurality of reflector elements each one associated to a respective primary focus, wherein said secondary reflector elements are arranged at different height and/or distances from the vertical axis passing for the common secondary focus.

17. An optical assembly, configured to be used in a plant for storage and/or production of energy of solar origin, which optical assembly comprises:
   a primary optical reflection system, arranged at the ground and configured so as to reflect the incident solar radiation according to a plurality of primary focuses, which primary optical system comprises one or more primary reflector elements; and
   a secondary optical reflection system, configured so as to collect the solar radiation coming from the primary system and direct it towards a single secondary focus, which secondary optical system comprises a plurality of secondary reflector elements, each one associated with a respective primary focus,
   wherein said secondary reflector elements have a planar reflective surface,
   wherein said secondary system is configured so that, in use, the secondary elements of said plurality reflect the radiation concentrated at the respective primary focuses towards said single common secondary focus, and
   wherein said one or more primary reflector elements and said secondary reflector elements are biaxially orientable, individually or in groups, during use so that they follow the apparent motion of the sun to reflect the radiation towards the respective primary focus and secondary focus.

* * * * *